Figure 1:
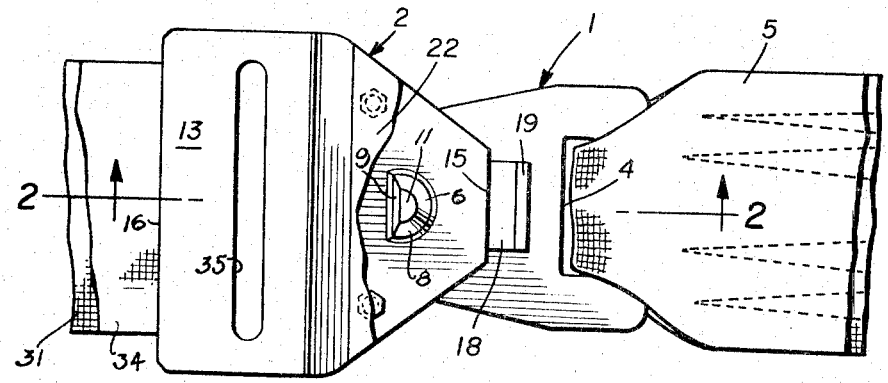

Jan. 23, 1968  J. E. HATFIELD  3,364,532
CONE TYPE SAFETY BELT BUCKLE
Filed Nov. 3, 1966  4 Sheets-Sheet 1

INVENTOR
John Edward Hatfield

BY
ATTORNEYS

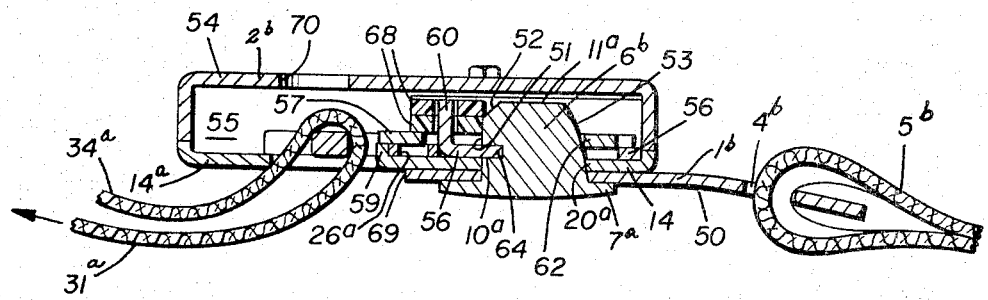

Jan. 23, 1968  J. E. HATFIELD  3,364,532
CONE TYPE SAFETY BELT BUCKLE
Filed Nov. 3, 1966  4 Sheets-Sheet 4
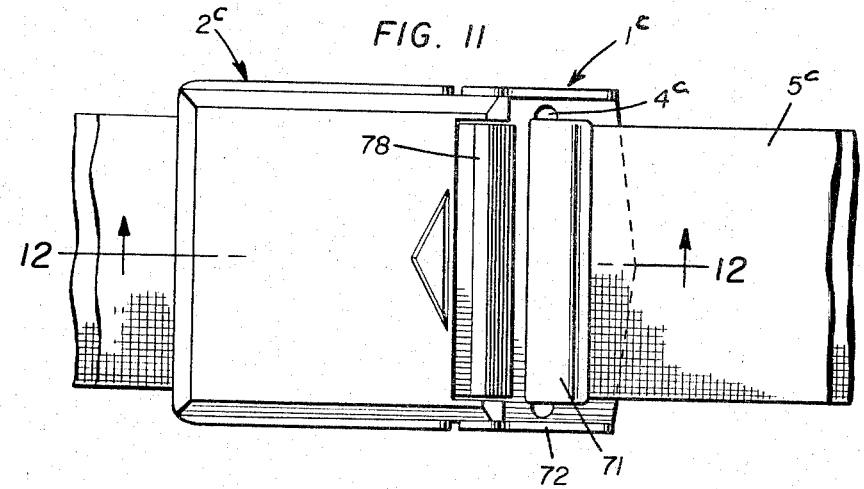
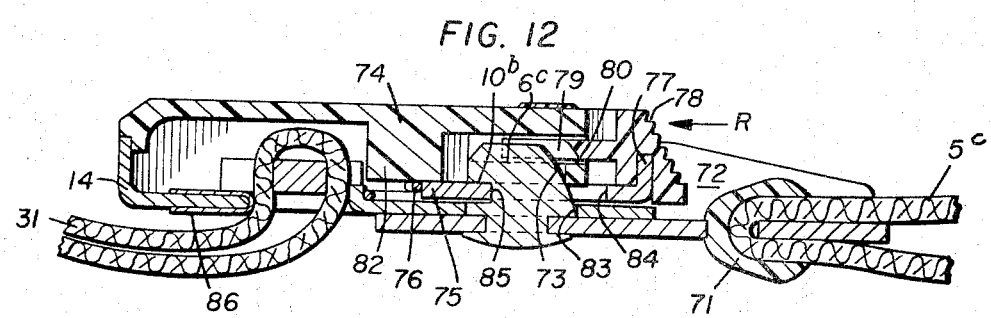
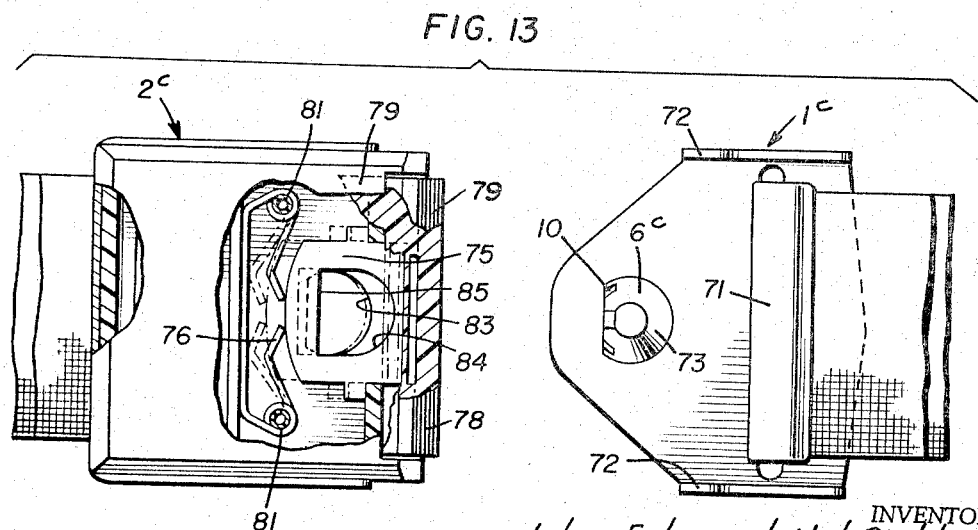
INVENTOR
John Edward Hatfield.
BY Rommel, Allwine and Rommel
ATTORNEYS United States Patent Office 3,364,532
Patented Jan. 23, 1968

3,364,532
CONE TYPE SAFETY BELT BUCKLE
John E. Hatfield, Stotfold, England, assignor to Irving Air Chute Company, Inc., Lexington, Ky., a corporation of New York
Filed Nov. 3, 1966, Ser. No. 591,841
Claims priority, application Great Britain, Nov. 11, 1965, 47,984/65; Apr. 6, 1966, 15,288/66
11 Claims. (Cl. 24—230)

This invention relates to couplings suitable for use on belts or harnesses, particularly vehicle safety belts or harnesses.

Very many safety belt couplings have recently been proposed and there are broadly two kinds of vehicle safety belt couplings widely in use. Some couplings are difficult for wearers to assemble upon themselves, because the parts can be inserted improperly.

According to the invention there is provided a coupling for a belt or harness including a first and a second part releasably connectible with one another, at least one part being adapted to be connected with a strap of a belt or harness, said parts having surfaces which overlap when the coupling parts are connected, the first part having a projection upstanding from the said surface thereof and the second part having a hole in the said surface thereof to receive said projection upon said parts being brought into overlapping relationship by relative movement of the parts in the direction of insertion of said projection through said hole, the arrangement being such that when in use said belt or harness is placed in tension the force tending to separate the parts is largely taken in shear by said projection, said second part including a spring biassed latching member adapted to move in a plane generally at right angles to said direction of insertion of said projection through said hole to engage in a recess in the projection to prevent removal of the projection from the hole unless the latching member is displaced against the bias, the arrangement of the projection and latching member being such that the latching member is displaced against the bias by the projection as it engages the hole and springs back to engage the recess when the projection is fully inserted, manually operable means being provided for displacing the latching member to release the coupling, and the surface of the projection which in use transmits the force between the two parts being so inclined that, when the latching member is displaced to release the coupling when said coupling is placed in tension, the said force acting between the parts tends to move the projection out of the hole.

A coupling according to the invention can be extremely simple to assemble even by a vehicle passenger wholly inexperienced with the coupling. No part of the coupling can have a tendency to move at right angles to the general plane of the coupling in the event of sudden deceleration which could result in release of the coupling.

The coupling is also simple to release since when there is a force tending to separate the coupling parts, the coupling will be released the instant that the latching member is displaced. The angle of said inclined surface of the projection must be sufficiently large for a quick release action to occur, yet should not be so large that an undue force is transmitted to the latching member when the parts are under tension. The projection is restrained from movement out of the aperture by the latching member and thus when the coupling parts are under tension a force is applied to the latching member in the direction of extension of said projection. If this force is too large, frictional forces tending to oppose displacement of the latching member will be such that too great a force is required to displace the latching member. It is a requirement of vehicle safety belt buckles that the force required to release them is small even when the tension in the belt is high. It has been found that with a coupling according to the invention this requirement can be fulfilled.

In many known couplings the latching member moves at right angles to the line of force between the coupling parts and is subject to the force between the coupling parts so that frictional resistance to movement of the latching member is great. With the present invention the latching plate moves in a plane parallel to the force between the coupling parts and the force on the latching plate caused by tension between the coupling parts is relatively small. The coupling can therefore be released by applying a relatively small force to the latching member, even when the tension in the strap is high.

Alternatively a manually displaceable auxiliary member may be provided indirectly to displace the latching member. The direction of displacement of the auxiliary member may be arranged to be different from the direction of displacement of the latching member for greater convenience in releasing the coupling. Thus in one arrangement the direction of displacement of the auxiliary member is arranged to be generally at right angles to the direction of displacement of the latching member and in particular the auxiliary member is disposed so as to be capable of being displaced to release the coupling as a result of grasping the coupling between the fingers and thumb of the hand.

The auxiliary member could consist of a pivoted bell crank lever. There could be two bell crank levers arranged on opposite sides of the second coupling part so that they can be simultaneously depressed towards one another when the coupling is grasped in the hand.

The latching member is preferably a plate having an aperture of a size to receive the projection, a portion of the edge of the plate forming the aperture serving to engage in the recess in the projection. Said portion of the plate is preferably straight, the recess being formed in a surface of the projection which is straight as seen in plan. The projection is preferably solid save for said recess.

The arrangement of the two coupling parts is preferably such that they can be coupled in only one position of relative orientation. This can most conveniently be achieved by forming the projection and aperture of complementary non-circular shape. The projection may have a partially conical surface which forms said inclined surface.

The surface of the projection which in use transmits the force between the two parts is inclined at an angle to the direction of extension of said projection in order that when the latching member is displaced the force acting between the two parts tends to move the projection out of the hole. It has been found that if the inclined surface is straight as seen in longitudinal cross section and if, in use, the coupling parts become slightly inclined to one another during release, the effect of the inclined surface of the projection can be nullified since the angle between the line of action of the force between the two parts and the inclined surface may approach too closely to a right angle. This is particularly likely to happen when the coupling is used on a vehicle safety belt (with the coupling disposed on the wearer's abdomen with the projection extending away from the body) due to the curvature of the wearer's body.

This possible disadvantage may be avoided by curving the inclined surface of the projection (as seen in longitudinal section) so that the angle of inclination from the direction of extension of said projection increases with distance from the base of the projection.

It is desirable that the curvature of the inclined surface is chosen in relation to the possible angle of inclination between the two coupling parts (in the sense tending to nullify the effect of the inclination of the surface of the projection) so that, if the coupling parts become inclined to one another during release, there is always a tendency for the projection to be moved out of the hole as a result of the force between the two parts when the coupling is in tension.

Both coupling parts can be adapted to be secured to the strap of a safety belt or harness but the arrangement could be such that either coupling part was rigidly secured to, or formed part of, a fixed part of a vehicle, for example, the arm rest of a suitably reinforced vehicle seat. Either coupling part could be provided with a conventional length adjustor for a strap of the belt or harness.

Figure 2:
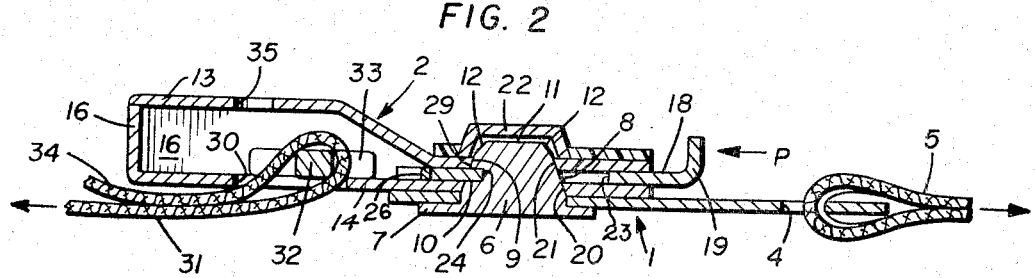
Figure 3:
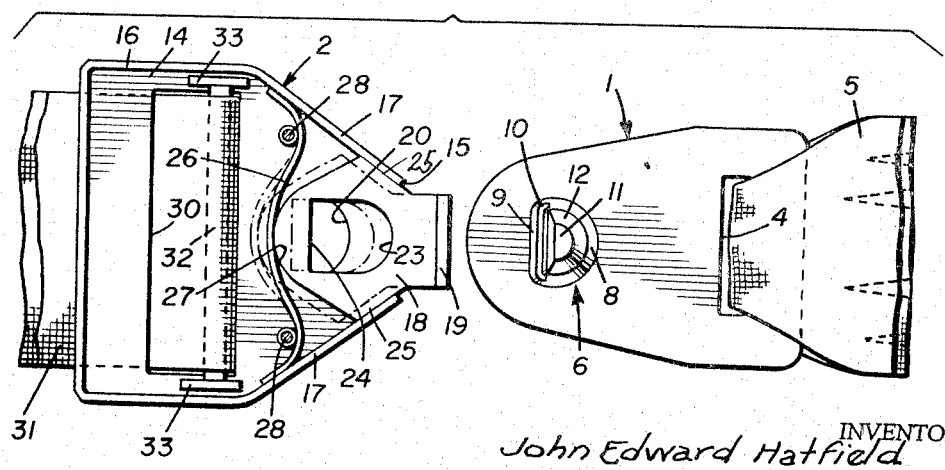
Figure 4:
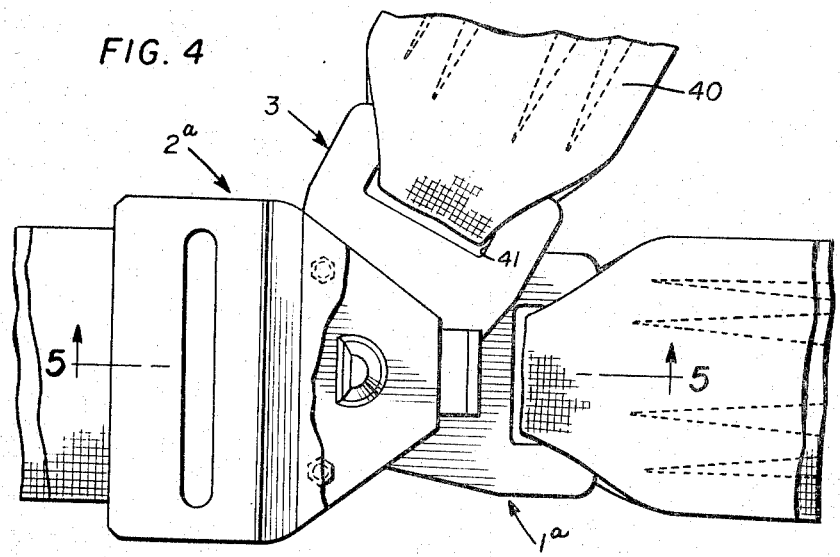
Figure 5:
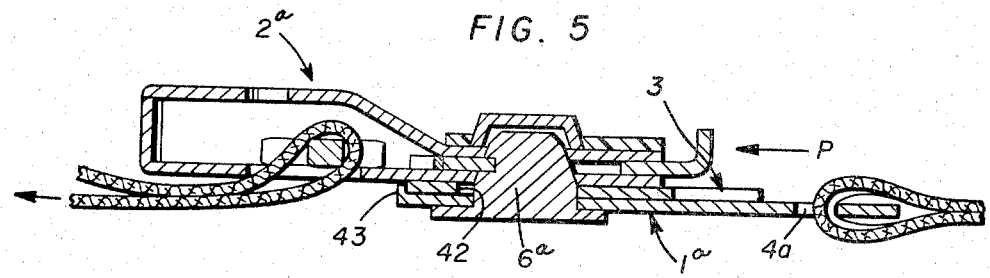

In order that the invention may be well understood four preferred embodiments will now be described in detail with reference to the accompanying drawings in which:

FIG. 1 shows a plan view of a first embodiment of the invention with part of the housing cut away, FIG. 2 shows an enlarged cross-sectional view taken on the line II—II of FIG. 1, FIG. 3 shows a plan view of the coupling of FIGS. 1 and 2 with the parts separated and with part of the housing of one part removed, FIG. 4 shows a plan view of a second embodiment of the invention with part of the housing cut away, FIG. 5 shows a section of the line 5—5 of FIG. 4.

Figure 6:
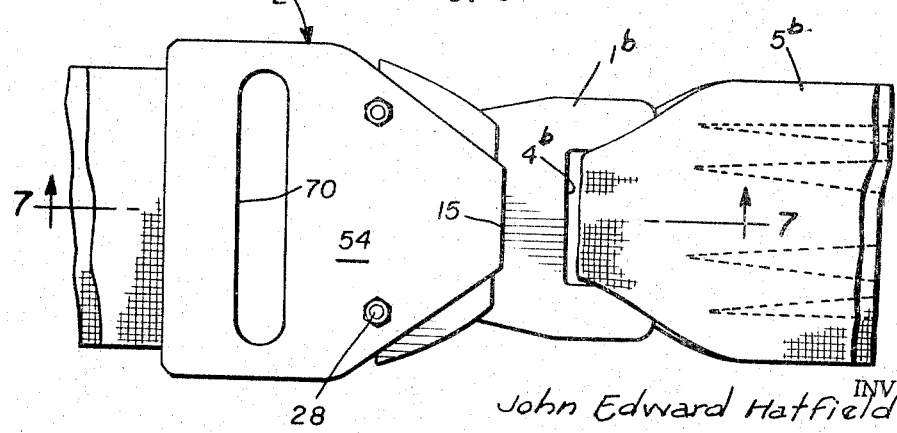

FIG. 6 shows a plan view of a third embodiment of the invention with the two coupling parts engaged, FIG. 7 shows an enlarged cross-sectional view on the line 7—7 of FIG. 6, FIG. 8 shows a plan view of one coupling part of the embodiment of FIG. 6 with some of its components removed, FIG. 9 shows a plan view of a component of the coupling of FIG. 6, FIG. 10 shows a plan view of the coupling parts of FIG. 6 disengaged, the cover being removed from one of the parts for clarity, FIG. 11 shows a plan view of a fourth embodiment of the invention with the two coupling parts engaged, FIG. 12 shows an enlarged cross-sectional view on the line 12—12 of FIG. 11, and FIG. 13 shows a plan view of the coupling of FIG. 11 with the parts separated and with part of the housing of one part removed.

The first embodiment shown in FIGS. 1 to 3 consists of two coupling parts 1 and 2. The first coupling part 1 is formed of a flat plate having a slot 4 at one end through which is passed a strap 5, the strap end being turned back and stitched on itself. The other end of the part 1 has an upstanding partly conical projection 6 passed through a hole in the plate. The projection 6 has a circular flange 7 at one end and is welded or otherwise suitably fixed to the flat plate of the part 1. The projection 6 has a conical surface 8 subtending rather more than 180° on the side nearest the slot 4 and a flat inclined surface 9 on its opposite side. There is a recess 10 in the surface 9. The top of the projection 6 has a flat top 11 and bevelled edges 12.

The second coupling part 2 consists of a housing formed from two steel stampings 13, 14. The housing parts 13, 14 are of similar shape in plan and consist of a rectangular portion at one end and a triangular portion at the other end, the apex of the triangle being cut off at 15. The housing part 14 has an upstanding flange 16 surrounding three sides of the rectangular part thereof. The triangular part of the housing 14 has two upstanding flanges 17 which are shorter in height than the flanges 16. The housing part 13 is shaped so as to be in contact with the top of the flanges 16 and 17. No flange extends across the apex 15 of the triangular part of the housing.

Disposed between the housing parts 13 and 14 is a latching plate 18 which has a portion projecting out of the gap between the housing parts 13, 14 at 15. The end of the latching plate 18 has an upturned portion 19.

The housing part 14 has a hole 20 in the triangular portion thereof adapted to receive the projection 6. A hole 21 is formed in the housing part 13 opposite the hole 20, and the holes 20 and 21 together conform to the projection 6 and are adapted to receive the projection 6. A plate 22 is secured to the housing part 13 over the hole 21 to prevent insertion of the projection 6 into the hole 20 from the side of the housing part 13.

The latching plate 18 has an aperture 23 therein with a straight edge 24 on the side of the aperture 23 remote from the projection 19. The latching plate 18 has two inclined edges 25 inclined at the same angle as the flanges 17 so that the latching plate 18 can be urged to center itself in the position shown in solid lines in FIG. 3.

A spring strip 26 bears against the outer edge 27 of the latching plate 18 to urge it outwardly of the housing. The spring strip 26 is held in position by two pins 28 and by the flanges 17. Upon pressing the projection 19 in the direction shown by the arrow P (FIG. 2) the latching plate 18 is displaced from the position shown in solid lines in FIG. 3 to the position shown in dotted lines. Upon release of the latching plate it will be spring urged back into its original position. When the latching plate is in the position shown in dotted lines in FIG. 3 the edge 24 of the aperture does not obstruct the aperture in the housing parts 13 and 14 and permits insertion of the projection 6. When the projection 6 is being inserted the bevelled surface 12 displaces the latching plate 18 to permit insertion. When the projection 6 has been fully inserted the latching plate 18 is urged back by the spring 26 so that the edge 24 enters the recess 10 in the projection 6 and locks the two coupling parts 1, 2 together.

The edges of the holes 20 and 21 are inclined to the perpendicular to the flat undersurface of the housing part 14 at an angle of 10° which is the same angle as the surface 8 of the projection 6 is inclined to the perpendicular to the plate of the coupling part 1. Thus a tension in a direction parallel to the coupling parts 1, 2, tending to separate the coupling parts will tend to urge the projection 6 out of the hole, but this is resisted by the edge 24 of the latching plate which engages in the recess 10. Upon pressing the projection 19 in the direction of the arrow P (FIG. 2) the projection slides out of the hole and the coupling is released.

The forces between the coupling parts are mainly taken in shear by the projection 6 which is appropriately dimensioned to take the forces that are expected to occur in use. The forces between the coupling parts also tend to exert some bending moment in the projection 6 and in the plate of the coupling part 1 and to reduce this to a minimum the edge 29 of the hole 21 adjacent the surface 9 of the projection 6 conforms closely to the surface 9 so that the projection 6 is restrained from bending movement.

The housing part 14 is provided with a slot 30 into which is threaded a strap portion 31. The strap portion 31 is looped around a bar 32 which is provided with transverse end portions 33 which guide the bar between the flanges 16. Tension in the strap 31 will move the bar 32 to trap the strap between the bar 32 and the edge of the slot 30. By pulling the free end 34 of the strap portion 31 the belt or harness can be tightened. A slot 35 is formed in the housing part 13 opposite the slot 30 to simplify threading of the strap 31 about the bar 32.

The second embodiment shown in FIGS. 4 and 5 is very similar to the first embodiment shown in FIGS. 1 to 3 but includes a third coupling part 3 for connecting a diagonal strap 40 of a lap and diagonal harness. The projection 6ª of the coupling part 1ª is made a little longer but in operation the coupling parts 1ª and 2ª are identical to the corresponding parts 1 nad 2 of FIGS. 1 to 3. The strap 5ª is similar to the strap 5 of the first form of invention and is connected in a slot 4ª of part 1ª.

The coupling part is formed of a flat plate having a slot 41 at one end thereof, the other end having a circular hole 42 so that the part 3 can be passed over the projection 6ª before the projection is plugged into the aperture of the coupling part 2ª. Upon releasing the coupling part 1ª and 2ª, the third coupling part 3 will also become released. The coupling parts 1ª and 2ª can be connected without the coupling part 3 if desired.

In this embodiment the coupling part 1ª may be provided with a projection 43 at its very end which serves to limit the pivotal movement of the coupling part 3 about the projection 6ª.

The other parts of the second embodiment are identical with those of the first embodiment.

The third embodiment shown in FIGURES 6 to 10 consists of two coupling parts 1ᵇ and 2ᵇ. The first coupling part 1ᵇ is formed of a plate which is slightly bent at 50 and has a slot 4ᵇ at one end through which is passed a strap 5ᵇ, the strap end being turned back and stitched on itself. The other end of the part 1ᵇ has a projection 6ᵇ passed through a hole in the plate and upstanding from the surface of the plate. The projection 6ᵇ has a circular flange 7ª at one end which is brazed to the plate of the part 1ᵇ, although alternatively the projection 6ᵇ may be rivetted to the plate so that a flange 7ª is formed. The projection 6ᵇ is circular as seen in plan (FIGURE 10) over the greater part of its circumference but has a flat surface 51 at right angles to the plate of the part 1ᵇ. There is a recess 10ª in the flat surface 51. The top of the projection 6ᵇ has a flat top 11ª and a bevelled edge 52.

The surface 53 of the projection 6ᵇ opposite flat surface 51 is curved as seen in section (FIGURE 7). At the base of the projection 6ᵇ the surface 53 is inclined at 15° to the plane of the part 1ᵇ, and the angle of inclination progressively increased with distance from the base of the projection 6ᵇ to a maximum of about 30°.

The second coupling part 2ᵇ includes a housing 14ª formed of steel and a cover plate 54. The cover plate 54 is formed of steel but since it does not serve to carry any large forces it could equally well be formed of plastic material. The parts 14ª and 54 are of a similar shape in plane and consist of a rectangular portion at one end and a triangular portion at the other end, the apex of the triangle being cut off at 15ª. The housing part 14ª has an upstanding flange 55 on opposite sides of the rectangular part thereof. The triangular part of the housing 14ª has an upstanding flange 17ª around its edge which is shorter in height than the flanges 55.

A latching plate 56 is seated in the housing part 14ª and is biased by a spring strip 26ª towards the end 15ª of the housing. The spring strip 26ª is of hairpin form as shown in FIG. 8.

A plate 57 is seated in the housing 14ª and is supported by the flanges 17ª so that it is spaced from the flat surface of the housing 14ª with the latching plate 56 sandwiched between the housing 14ª and plate 57. The plate 57 is also spaced by sleeve 58 which surrounds the screws or rivets 28ª and also by an upturned flange 59 (FIG. 7) on the housing 14ª.

The latching plate 56 has an upturned projection 60 and the plate 57 has a slot 61 (see FIG. 9) through which the projection 60 passes.

The housing part 14ª has a hole 20ª in the under-surface of the triangular portion thereof adapted to receive the projections 6ᵇ when the surface of the plate of the part 1ᵇ and the under-surface of the part 14ª overlap. A hole 62 is formed in the plate 57 opposite the hole 20ª, and the holes 20ª and 62 together are adapted to receive the projection 6ᵇ.

The latching plate 56 has an aperture 63 therein with a straight edge 64 on the side of the aperture 63 nearest the projection 60. The latching plate 56 has two edges 65 inclined at the same angle as the flange 17ª so that the latching plate 56 is urged by the spring strip 26ª to center itself.

Two bell crank levers 66 are seated on top of the plate 57. The screws or rivets 28 serve as pivots for the bell crank levers 66. The levers 66 are formed of a plastic material or nylon and one arm 67 of each lever projects beyond the housing 14ª over the flanges 17ª. The other arm 68 of each lever 66 has a slot 69 through which passes the projection 60. Upon applying pressure to the arms 67 in the direction shown by the arrows Q in FIGURE 10 the arms 68 will move away from the end 15ª of the housing 14ª and will displace the latching plate 56 against the bias in the spring 26ª. The direction of displacement of the arms 67 is thus generally at right angles to the direction of displacement of the latching plate 56.

When the projection 6ᵇ is being inserted into the holes 20ª and 62 the bevelled surface 52 displaces the latching plate 56 to permit insertion. When the projection 6ᵇ has been fully inserted the latching plate 56 is urged back by the spring 26ª so that the edge 64 enters the recess 10ª in the projection 6ᵇ and locks the two coupling parts 1ᵇ, 2ᵇ together.

When the coupling is placed in tension the force tending to separate the parts is largely taken in shear by the projection 6ᵇ.

The edge of the hole 20ª is preferably (as shown in FIG. 7) inclined to the flat under-surface of the housing part 14ª at the same angle as the angle of inclination of the base of the surface 53 to the direction of extension of the projection 6ᵇ. However, the hole 20ª may be formed by stamping out a portion in which case the edge of the hole 20ª will be at right angles to the plate. When in use the coupling parts 1ᵇ, 2ᵇ are placed in tension there would be a tendency for the projection 6ᵇ to be urged out of the aperture, but this is resisted by the edge 64 of the latching plate 56 which engages in the recess 10ª. Upon pressing the bell crank levers 66 in the direction Q by grasping the coupling between fingers and thumb the projection 6ᵇ slides out of the aperture and the coupling is released.

The curvature of the surface 53 as seen in section (FIGURE 7) is chosen in relation to the possible angle of inclination between the two coupling parts (in the sense tending to nullify the effect of the inclination of the surface 53) such that if the coupling parts 1ᵇ and 2ᵇ become inclined to one another during release, the angle of inclination of that part of the surface 53 which at any time is in contact with the edge of the hole 20ª in the housing 14ª is inclined such that there is always a tendency for the projections 6ᵇ to be moved out of the hole 20ª.

The possible angle of inclination between the two parts during release before the projection 6ᵇ finally emerges from the hole 20ª is limited by the very end 69 of the plate of the part 1ᵇ. Thus the curvature of the surface 53 has been chosen so that there is always a tendency for the projection 6ᵇ to be urged out of the hole 20ª if the housing part 14ª is rocked about the very end 69 of the part 1ᵇ during release.

The housing part 14ª is provided with a slot 30ª into which is threaded a strap portion 31ª as in the first embodiment shown in FIGS. 1 to 3. A slot 70 is formed in the cover 54 opposite the slot 30ª to simplify threading of the strap 31 about the bar 32ª.

The fourth embodiment shown in FIGS. 11 to 13 consists of two coupling parts 1ᶜ and 2ᶜ. The first coupling part 1ᶜ is formed of a flat plate having a slot 4ᶜ at one end through which is passed a strap 5ᶜ. The strap 5ᶜ is not stitched to itself but can be pulled through the slot 4ᶜ to adjust the position of the part 1ᶜ on the strap 5ᶜ. A resilient clip 71, U-shaped in cross-section, is disposed in the slot 4ᶜ and grips the strap 5ᶜ to stop it slipping. The sides of the part 1ᶜ have bent up walls 72. The other end of the part 1ᶜ has a projection 6ᶜ rivetted in a hole in the plate. The projection 6ᶜ is similar to the projection 6ᵇ of the third embodiment (FIGS. 6 to 10) in that it is curved as seen in section but its face 73 is more inclined to the perpendicular to the plate of the part 1ᶜ. The projection 6ᶜ has a recess 10ᵇ as in the other embodiments.

The second coupling part 2ᶜ includes a steel housing 14ᵇ and a synthetic resin cover plate 74. The parts 14ᵇ and 74 are generally rectangular as seen in plan.

The method of attaching the strap 31ᵇ to the housing 14ᵇ is as in the previous embodiments. A guard 86 is however provided to prevent abrasion between the strap 31ᵇ and any sharp edge on the housing part 14ᵇ.

A latching plate 75 is seated in the housing part 14ᵇ and is biased by a spring 76 towards one end of the housing 14ᵇ. The latching plate has an upstanding end 77 which makes a push fit with a synthetic resin push button 78.

The latching plate 75 has an aperture 84 with a straight edge 85 on the side of the aperture remote from the upstanding end 77.

The push button 78 extends the whole width of the cover plate 74 and it has a projection 79 which slides in a slot 80 in the cover plate 74.

The cover plate 74 has two bosses 81 formed on an enlargement 82 to enable it to be connected to the housing 14 by means of two screws passed up through the housing 14ᵇ. The spring 76 is located on the bosses 81.

The housing part 14ᵇ has a stamped out hole 83 adapted to receive the projection 6ᶜ, and when the projection is inserted in the hole 83 the latching plate 75 is displaced against the spring and then springs back so that the straight edge 85 engages in the recess 10ᵇ of the projection 6ᶜ. Upon applying a force on the push button 78 in the direction R the latching plate 75 is displaced out of the recess 10ᵇ and tension between the coupling parts 1ᶜ and 2ᶜ will cause the projection 6ᶜ to move out of the hole 83 so that the coupling is released.

The fourth embodiment (FIGS. 11 to 13) is therefore similar to the first embodiment (FIGS. 1 to 3) in that it is released upon applying a force in the direction of force between the coupling parts 1ᶜ and 2ᶜ and is similar to the third embodiment (FIGS. 6 to 10) in that the surface of the projection which transmits the force between the coupling parts is curved as seen in section.

There have thus been provided several embodiments of a coupling which is extremely easy to assemble since a single relatively large tapered projection simply has to be inserted in a cooperating hole upon bringing the coupling parts into overlapping relationship.

Various changes in the shape, size and arrangement of parts may be made to the forms of invention herein shown and described without departing from the spirit of the invention and scope of the claims.

I claim:

1. A coupling for a belt or safety harness comprising a first and second part releasably connectable with one another, at least one part being adapted to be connected with a strap of a belt or harness, said parts having surfaces which overlap when the coupling parts are connected, the first part having a projection upstanding from the said surface thereof provided with a transverse recess therein, and the second part having a hole therethrough to receive said projection when said parts are brought into overlapping relationship by relative movement of the parts in the direction of insertion of said projection through said hole, the arrangement being such that when in use said belt or harness is placed in tension the force tending to separate the parts is largely taken in shear by said projection, said second part including a spring biased latching member adapted to move in a plane generally at right angles to said direction of insertion of said projection through said hole to engage in the recess in the projection to prevent removal of the projection from the hole unless the latching member is displaced against the bias, the arrangement of the projection and latching member being such that the latching member is automatically displaced against the bias by the projection as it engages the hole and moves back against the bias to then engage in the recess when the projection is fully inserted, manually operable movable means for displacing the latching member to release the coupling, the surface of the projection which in use transmits the force between the two parts being at a portion thereof at an angle to the axis of the projection so that when the latching member is displaced to release the coupling when said coupling is placed in tension by reason of the closed belt, the said force acting between the parts tends to move the projection out of the hole.

2. A coupling as claimed in claim 1 in which the recess in said projection in which said latching member engages is formed on the side of the projection remote from said angled surface of the projection which in use transmits the force between the two parts.

3. A coupling as claimed in claim 2 in which movable means is provided to manually move the latching member to relatively release the coupling parts in a push action in a direction parallel to the direction of belt tension force tending to separate the parts.

4. A coupling as claimed in claim 1 in which the direction of displacement of the movable means is arranged to be generally at right angles to the direction of displacement of the latching member.

5. A coupling as claimed in claim 4 in which the movable means consists of pivoted bell crank lever means.

6. In a coupling adaptable for a safety belt or the like; the combination of a pair of inter-engagable parts, one part of which is provided with a transverse aperture therein, the other being provided with a segmental cone shaped projection transverse thereto adapted to fit into said aperture, said segmental cone shaped projection tapering axially and having a transversely flat side provided with a transverse recess therein facing in the direction of the movement of said two parts to overlap the same, a latching member movably carried by that part having the aperture therein and which latching member is related to the aperture so as to move partially across the aperture in the direction of the other coupling part, spring biasing means normally urging said latching member into such position with respect to the aperture, said projection having the flat side inclined to the axis of the projection so that when the projection is being inserted into the aperture it will engage said latching member and move the same against the spring bias until the recess of the projection is opposite the latching member whereupon the spring bias will force the latching member into said recess and lock the parts together.

7. A coupling defined in claim 6 in which the projection inclination is at such an angle that when the latching member is displaced to release the coupling parts the tension of the belt acting upon the coupling parts tends to move the projection out of the aperture.

8. The buckle described in claim 6 in which a third belt connected part is provided having an aperture for also receiving said projection.

9. The buckle as described in claim 6 in which manually movable means is provided upon the part having the aperture therein for moving the latching member out of said recess.

10. The buckle described in claim 9 in which the manually movable means comprises a bell crank lever pivoted on the part having the aperture therein and connected with the latching member so that upon movement of the lever the latching member will be moved against its spring bias into release position with respect to said projection.

11. The buckle described in claim 6 in which a slidable push button is mounted on the part having the aperture therein inner connected with the latching member so that upon manual movement of the same the latching member will be retracted against its spring bias from the recess of said projection.

References Cited

UNITED STATES PATENTS

| | | | |
|---|---|---|---|
| 836,536 | 11/1906 | Roche | 24—211 |
| 1,565,678 | 12/1925 | Severson | 24—230.1 |
| 3,122,808 | 3/1964 | Maschi | 24—230.1 |

BERNARD A. GELAK, *Primary Examiner.*